United States Patent [19]
Yokota et al.

[11] Patent Number: 5,277,527
[45] Date of Patent: Jan. 11, 1994

[54] TORQUE ADJUSTMENT DEVICE

[75] Inventors: Takao Yokota; Yasuo Wada, both of Fuchu, Japan

[73] Assignee: Ryobi Limited, Tokyo, Japan

[21] Appl. No.: 856,533

[22] Filed: Mar. 24, 1992

[30] Foreign Application Priority Data

Mar. 29, 1991 [JP] Japan .................. 3-019996[U]

[51] Int. Cl.$^5$ ............................................ B23B 45/00
[52] U.S. Cl. .................................... 408/139; 192/150
[58] Field of Search ................. 192/56 R, 150; 408/6, 408/9, 139, 124; 173/178

[56] References Cited

U.S. PATENT DOCUMENTS

| | | | |
|---|---|---|---|
| 3,235,050 | 2/1966 | Schoppe et al. | 192/56 R |
| 3,305,058 | 2/1967 | Orwin et al. | 192/150 |
| 4,113,080 | 9/1978 | Thackston et al. | 192/150 |

*Primary Examiner*—Daniel W. Howell
*Attorney, Agent, or Firm*—Brooks & Kushman

[57] ABSTRACT

A torque adjustment device is disclosed which enhances durability and in which it is easy to set a maximum torque and to perform fine adjustment while normally keeping constant a rotational force of a torque adjustment sleeve. A cylindrical clutch adjustment handle is rotatably mounted at an opening portion of a housing. A clutch case is received within the clutch adjustment handle. A plurality of slant surfaces which are different in height in the axial direction are formed in an inner circumferential portion of the clutch adjustment handle. A clutch plate is supported to the slant surfaces. Also, the clutch plate is displaceably mounted along an outer peripheral portion of the clutch case. Steel balls which are held by a clutch surface of an inwardly toothed gear are received in holes of the clutch case. A spring is interposed between an abutment plate in abutment with the steel balls and the clutch plate. A plurality of recesses are formed in a flanged portion of the clutch adjustment handle. A projection of a positioning plate is engaged with the associated recess.

10 Claims, 7 Drawing Sheets

TORQUE ADJUSTMENT DEVICE

BACKGROUND OF THE INVENTION

The present invention relates to a torque adjustment device and more particularly to a torque adjustment device used in an electric drill.

In torque adjustment devices for electric drills used in general, ones disclosed in Japanese Utility Model Laid Open Application No. 59-183764 and Japanese Patent Publication No. 57-61554 are extensively known.

In a device shown in Japanese Utility Model Laid Open Application No. 59-183764, a groove is formed in an end face of a clutch adjustment handle, and a clutch mounting plate having a projection engageable with the groove is provided on the end face of the clutch adjustment handle. The clutch adjustment handle is rotated so that the clutch adjustment handle is moved in an axial direction corresponding to a height of the projection.

In the device shown in Japanese Patent Publication No. 57 61554, a flat portion is provided in a slanted surface formed in a support member and the slanted surface is formed in a stepped shape. A recess into which the clutch plate is inserted is formed in the flat portion. The clutch plate is inserted into the recess to thereby determine the rotational position of the support member. The amount of compression of a clutch spring for pushing the clutch plate causes the adjustment of the retainer force of an inwardly toothed gear through steel balls, thereby adjusting the output torque.

However, in the device disclosed in Japanese Utility Model Laid Open Application No. 59-183764, since the clutch adjustment handle is moved in the axial direction, it is necessary to provide a gap between the clutch adjustment handle and the housing, resulting in worse appearance. Also, since the compression amount of the spring is changed due to the movement, it is difficult to set a maximum torque. Furthermore, since the clutch adjustment handle is made of resin and the clutch mounting plate is made of steel, the groove of the clutch adjustment handle is worn out, resulting in disabling the positioning.

On the other hand, in the device disclosed in Japanese Patent Publication No. 57-61554, when the lock condition is kept (i.e., the spring is kept under the compressed condition), the clutch plate is inserted into the recess of the flat portion. Accordingly, in order that the clutch plate rides over the recess, it is impossible to keep the spring under the sufficiently compressed condition under the lock condition. It is therefore impossible to perform fine adjustment of the torque, and it is difficult to set a maximum torque. The force for rotating the support member is different between the condition where the clutch spring is compressed and the condition where the clutch spring is not compressed. Accordingly, the rotational force is not uniform. Furthermore, although the click feeling is obtained under the compression condition, there is no click feeding under no compression. It is therefore difficult to judge whether or not the desired position is obtained. Also, the support claws of the clutch plate are strongly pushed against the flat portion of the slanted surface by the clutch spring. Under this condition, when the support member is rotated, the support claws ride over the flat portion under the condition where the support claws are strongly pushed against the flat portion. In general, the support member is made of resin and the clutch plate is made of steel. Accordingly, the flat portion of the slanted surface is worn out or deformed, resulting in poor durability.

SUMMARY OF THE INVENTION

In order to overcome the above noted various problems inherent in the prior art, an object of the invention is to provide a torque adjustment device which enhances the durability, in which it is easy to set a maximum torque and to carry out fine adjustment, and which can normally keeps constant the rotational force of the torque adjustment sleeve.

According to the present invention, there is provided a torque adjustment device for adjusting the operation of a clutch mechanism for transmitting rotational force from a drive source to a spindle, wherein one end of a cylindrical torque adjustment sleeve is rotatably mounted at an opening portion of a housing, a bearing clutch case for supporting the spindle is received in the torque adjustment sleeve, a plurality of slant surfaces which are different in height in the axial direction are formed in an inner circumferential portion of the torque adjustment sleeve, a torque adjustment plate is supported on the slanted surfaces, a resilient member is interposed between the torque adjustment plate and the clutch mechanism, a positioning plate provided at an end face of the bearing clutch case is in abutment with the other end of the torque adjustment sleeve, and a click mechanism is formed between the positioning plate and the other end of the torque adjustment sleeve.

When the torque adjustment is desired, first of all, the torque adjustment sleeve is rotated so that the engagement relation between the engagement portion of the positioning plate and the engagement portion of the torque adjustment sleeve is changed. Then, since the torque adjustment plate is moved along the slanted surface, the spring force of the resilient member is changed, and the depression force for pushing the clutch mechanism is changed to thereby perform the torque adjustment. Also, since the rotational position adjustment is performed by the engagement position between the engagement portion of the positioning plate and the engagement portion of the torque adjustment sleeve, it is possible to avoid wear and deformation of the slanted surface.

DESCRIPTION OF THE PREFERRED EMBODIMENTS

One embodiment of the present invention will now be described with reference to the accompanying drawings.

Figure 1:
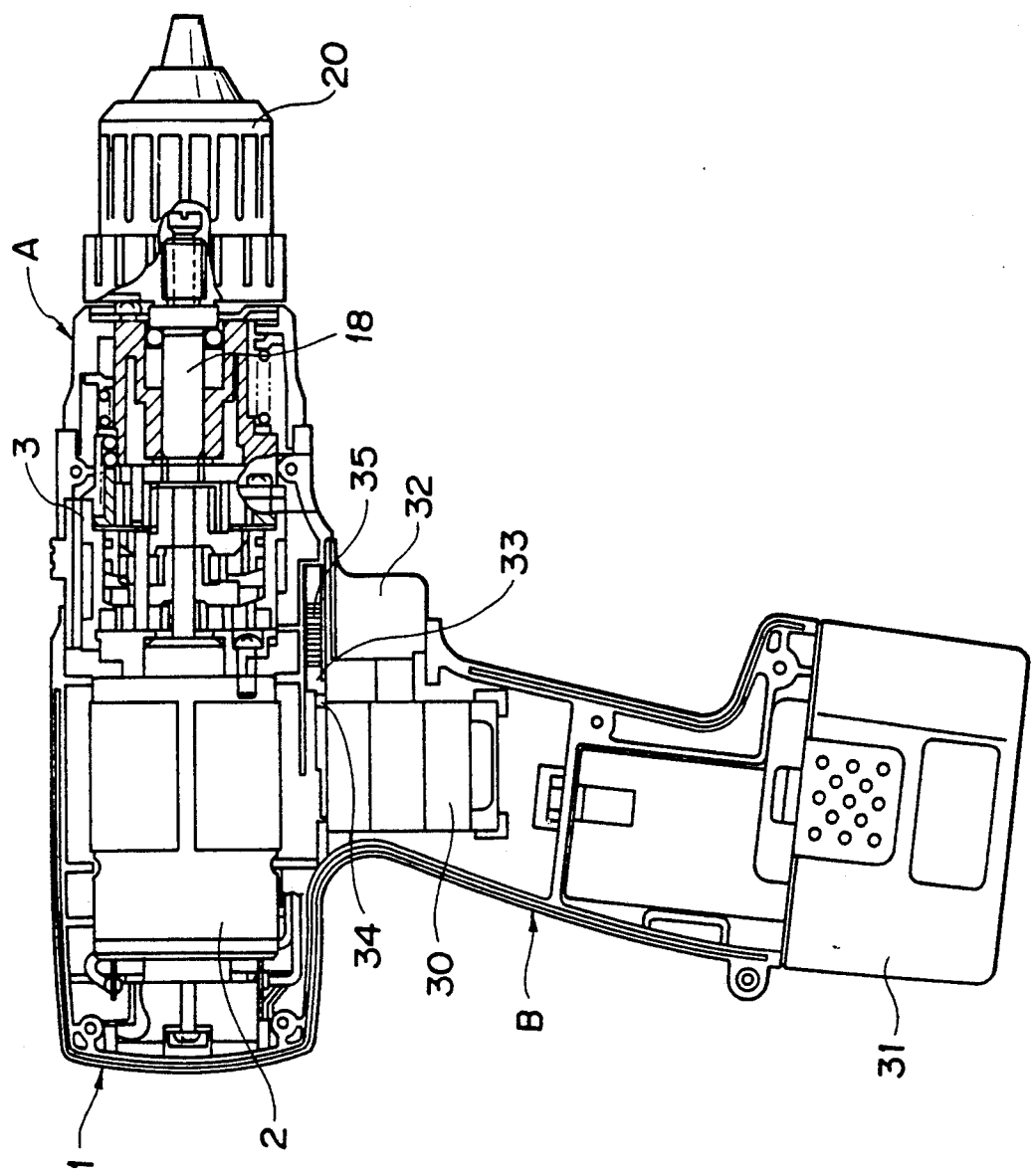
FIG. 1 is a sectional view showing an overall electric drill provided with a torque adjustment device according to the invention.

FIG. 1 is a sectional view showing an electric drill provided with a torque adjusting device according to the invention. The electric drill is composed of an operating mechanism part A for operatively rotating a tool and a grip part B for an operator to grip the body and turn on/off a switch. Reference numeral 1 denotes a tool body in the form of a pistol. A drive motor 2 is installed in the tool body 1. A substantially cylindrical gear case 3 is disposed at the output end of the drive motor 2 within the tool body 1 so as to be spaced a predetermined distance away from the inner surface of the tool body 1. A switch body 30 for the drive motor 2 is installed in the middle and lower portion of the tool body 1 (FIG. 1). A battery 31 is detachably mounted in the lower end portion of the tool body 1 for supplying an electric power to the drive motor 2. A trigger switch 32 for turning on/off the switch body 30 is mounted on the tool body 1. A switch lever 33 for switching the motor 2 in a forward direction and a reverse direction is disposed above the trigger switch 32. The forward-/reverse rotation switching lever 33 is rotatable about a pivot pin 34 provided at the middle portion of the lever 33. Operational projections 35 are integrally formed to project from both sides of the forward/reverse rotation switching lever 33. In this embodiment, under the condition that the operator who operates the tool body 1 grips the tool body, he may push the operational projections 35 forwardly (in the right in FIG. 1) by his finger, whereby the forward/reverse rotation switching lever 33 is operatively rotated to operate a forward/reverse rotation switching pin (not shown) for the switch body 30.

Figure 2:
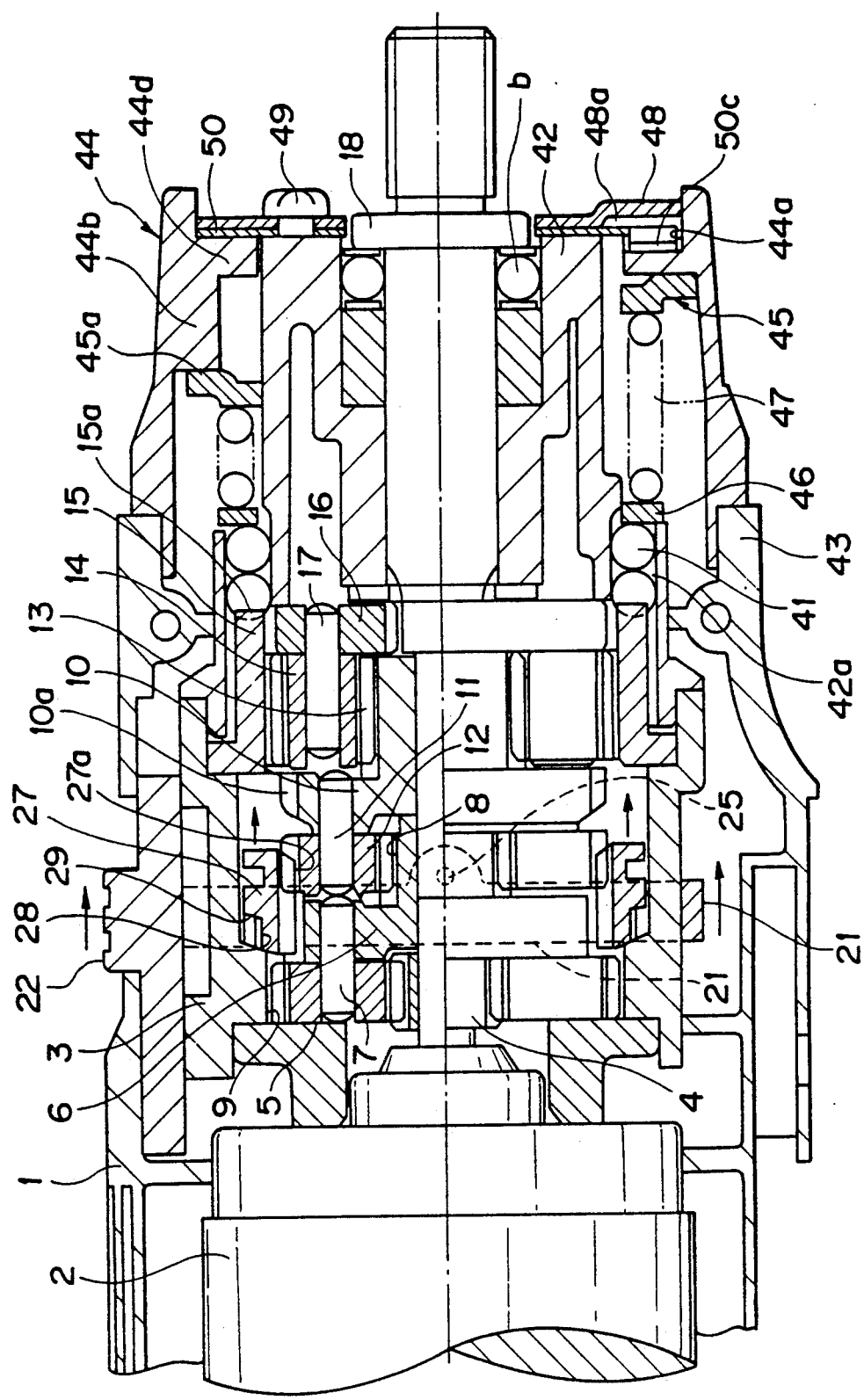
FIG. 2 is an enlarged sectional view showing the torque adjustment device shown in FIG. 1.

FIG. 2 is an enlarged sectional view showing in detail a gear mechanism for transmitting a rotational power from the drive motor 2 as well as a clutch mechanism. A plurality of planetary gears 5 which constitute a first-stage planetary speed reduction mechanism mesh with an output pinion 4 of the drive motor 2. Each planetary gear 5 is rotatably mounted about a shaft 7 which projects from one side of a planetary gear retainer plate 6. A sun gear 8 which constitutes a second-stage planetary speed reduction mechanism is integrally formed on the other side of the planetary gear retainer plate 6. An inwardly toothed gear 9 formed in an inner surface of the gear case 3 meshes with the respective planetary gears 5.

A plurality of planetary gears 12 which are rotatably supported on shafts 11 of a second stage planetary gear retainer plate 10 mesh with the sun gear 8 of the second stage. Outward teeth 10a are formed on an outer peripheral portion of the planetary gear retainer plate 10. A sun gear 13 of a third stage planetary speed reduction mechanism is integrally formed on the other side of the planetary gear retainer plate 10.

A plurality of planetary gears 14 mesh with the third stage sun gear 13. The planetary gears 14 also mesh at their outside with an inwardly toothed gear (a speed reduction gear) 15. The respective planetary gears 14 are mounted through shafts 17 on a planetary gear retainer plate 16 which rotates together with the planetary gears 14. A spline formed in a spline shaft 18 which serves as a spindle is engaged with an inner portion of the planetary gear retainer plate 16. Furthermore, a chuck 20 for clamping a desired tool is connected to a tip end of the spline shaft 18 (FIG. 1).

An annular retainer ring 21 which is made of resin material having a spring property is interposed displaceably in the axial direction between the tool body 1 and the gear case 3. A slide lever 22 exposed from an upper surface of the tool body 1 to the outside is integrally formed with an upper portion of the retainer ring 21 (FIG. 2). Guide pins 25 are projectingly formed on both inner sides of the retainer ring 21. The guide pins 25 are disposed so as to be inserted into the inside of the gear case 3 through guide holes (not shown) extending in the axial direction and formed on both sides of the gear case 3.

A slide gear 27 provided with an inward teeth 27a engaged with the planetary gears 12 are disposed displaceably in the axial direction at a position within the gear case 3 and corresponding to the outer portions of the planetary gears 12 which are engaged with the second stage sun gear 8. The guide pins 25 of the retainer ring 21 are connected to the slide gear 27. Further, retainer projections 28 are formed in the vicinity of the inward teeth of the gear case 3. Retainer recesses 29 engaged with the retainer projections 28 are formed in the outer circumference of the slide gear 27. Then, by moving the slide lever 22 back and forth so that the engagement projection is engaged with the engagement recess of the tool body 1, the retainer ring 21 is moved in the axial direction. The movement of the retainer ring 21 causes the guide pins 25 to move along the guide holes (not shown) of the gear case 3 to thereby move the slide gear 27. When the movement of the slide gear 27 causes the retainer recesses 29 of the slide gear 27 to engage with the retainer projections 28 of the gear case 3, the rotation of the slide gear 27 is prevented and the speed of the planetary gears 12 is reduced so that the spline shaft 18 is drivingly rotated at a low speed. When the engagement between the retainer recesses 29 of the slide gear 27 and the retainer projections 28 is released, the inward teeth 27a of the slide gear 27 are engaged with the outward teeth 10a of the planetary gear retainer plate 10, and the slide gear 27 is rotated together with the sun gear 8, the planetary gear retainer plate 10 and the planetary gears 12, the speed reduction is not effected and the spline shaft 18 is rotated at a high speed.

Figure 3A:
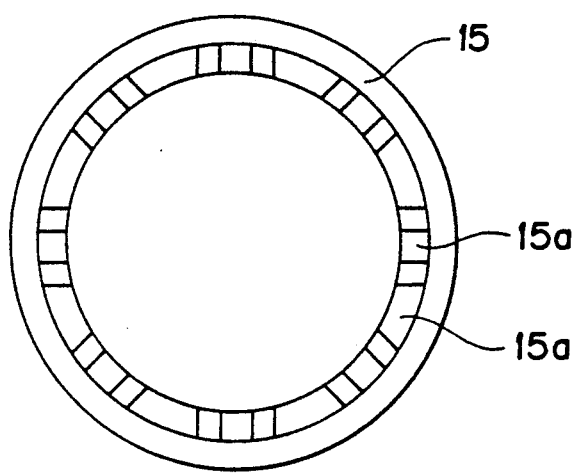
FIG. 3A is a frontal view showing an inwardly toothed gear shown in FIG. 2.
Figure 3B:
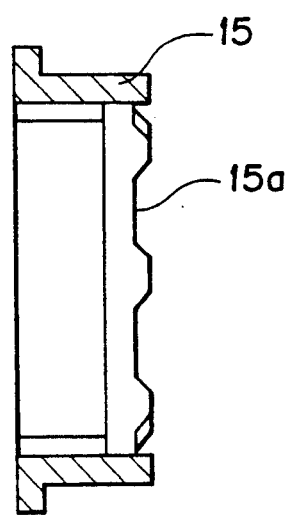
FIG. 3B is a cross-sectional view showing the gear shown in FIG. 3A.
Figure 4A:
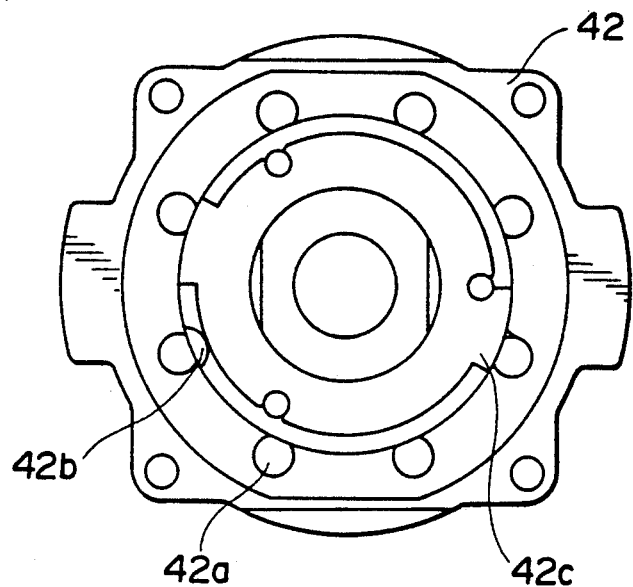
FIG. 4A is a frontal view showing a clutch case shown in FIG. 2.
Figure 4B:
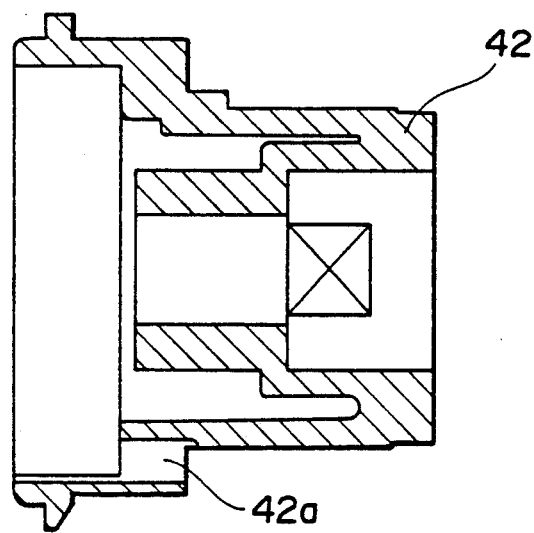
FIG. 4B is a sectional view showing the clutch case shown in FIG. 4A.
Figure 5A:
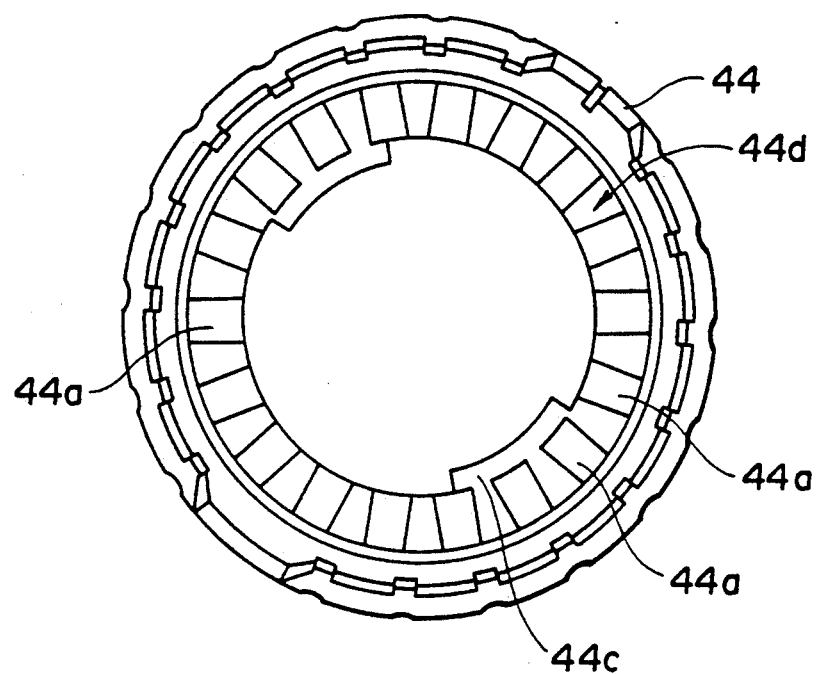
FIG. 5A is a frontal view showing a clutch adjustment handle shown in FIG. 2.
Figure 5B:
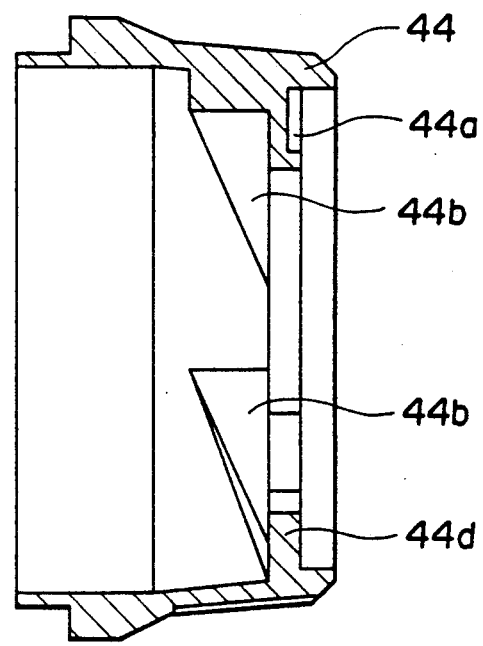
FIG. 5B is a sectional view showing the clutch adjustment handle shown in FIG. 5A.
Figure 6:
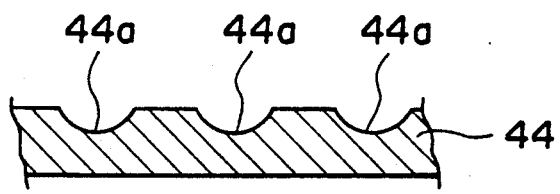
FIG. 6 is a partial sectional view showing recesses of the clutch adjustment handle shown in FIGS. 5A and 5B.
Figure 7A:
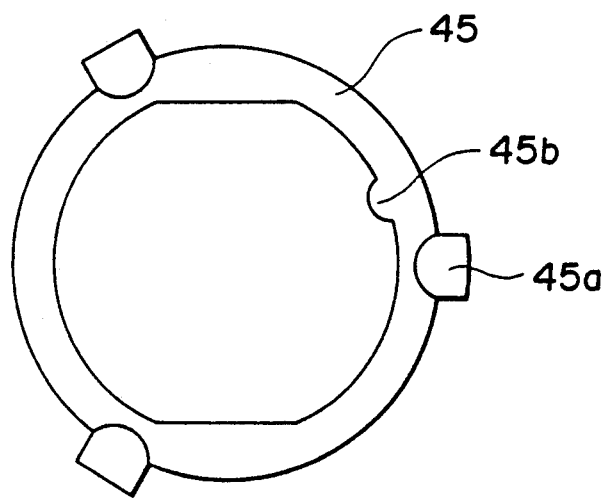
FIG. 7A is a frontal view showing a clutch plate shown in FIG. 2.
Figure 7B:
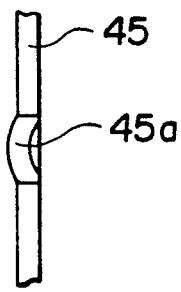
FIG. 7B is a side view partially showing the clutch plate shown in FIG. 7A.
Figure 8A:
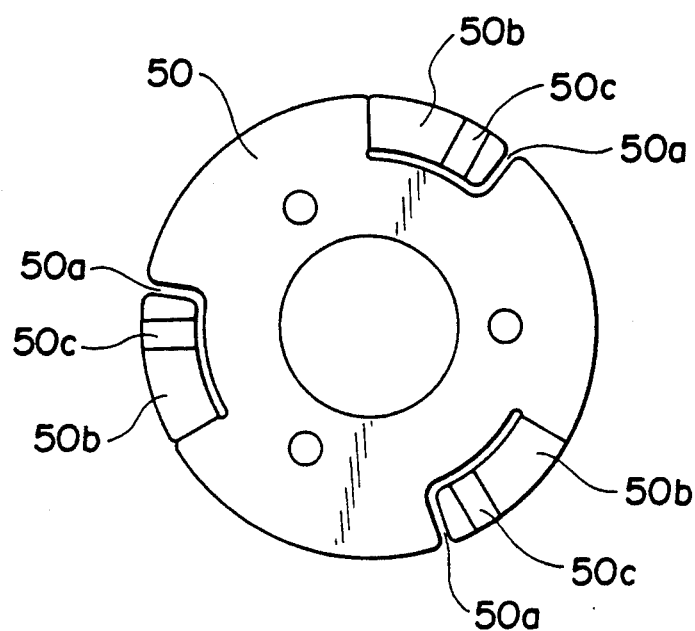
FIG. 8A is a frontal view showing a positioning plate shown in FIG. 2.
Figure 8B:
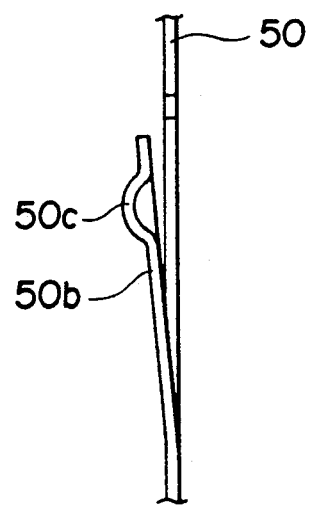
FIG. 8B is a side view partially showing the positioning plate shown in FIG. 8A.

On the other hand, a clutch surface 15a is formed at the right end (in FIG. 2) of the inwardly toothed gear 15 (see FIGS. 3A and 3B). The inwardly toothed gear 15 is inserted into a bearing clutch case 42 for supporting rotatably the spindle 18 through a bearing b as shown in FIGS. 4A and 4B. Steel balls 41 are retained within holes 42a formed in the clutch case 42. Furthermore, the steel balls 41 are held by the clutch surface 15a. As shown in FIG. 2, a cylindrical clutch adjustment handle as a torque adjustment sleeve 44 shown in FIGS. 5A, 5B, and 6 is rotatably mounted at an end of an opening portion of a housing 43 of the tool body 1. Slant surfaces 44b having a height with respect to the axial direction are formed in the inner wall portion of the clutch adjustment handle 44. A ring-like clutch plate as a torque adjustment plate 45 provided with a plurality of claws 45a which may abut against the slant surfaces 44b is displaceably engaged with the outer surface of the clutch case 42 (see FIGS. 7A and 7B). A coil spring 47 is interposed between the clutch plate 45 and an abutment plate 46 which abuts against the steel balls 41. The spring 47 urges the clutch plate 45 and the abutment plate 46 to move away from each other. A positioning plate 50 and a push plate 48 are secured to the end portion of the clutch case 42 by fastening screws 49 as fastening means in a state wherein the positioning plate 50 is covered with the push plate 48. The positioning plate 50 is brought into abutment with a flanged portion 44d extending from the inner circumferential surface of the clutch adjustment handle 44 and projecting radially inwardly in the vicinity of the right end of the handle 44 (in FIG. 2), thereby preventing the clutch plate 45 and the torque adjustment sleeve 44 from being pushed outside (in the right direction in FIG. 2). The clutch adjustment handle 44 is formed as shown in FIGS. 5A, 5B and 6. A plurality of recesses 44a extending in the radial direction are formed in an annular form with a predetermined space at the right end (in FIG. 5B) of the flanged portion 44d of the clutch adjustment handle 44. The cross sections of the recesses 44a is arcuate as shown in FIG. 6. The positioning plate 50 is made of steel in the form as shown in FIG. 8A. Three cutaways 50a each of which extending continuously in the radial direction and in the circumferential direction are formed equiangularly in the circumference of the plate 50 to form resilient portions 50b (see FIG. 8A). Projections 50c each of which extends in the radial direction and is selectively engageable with the associated recess 44a of the clutch adjustment handle 44 are formed in the resilient portions 50b. Upon mounting, the projections 50c are normally engaged with the recesses 44a. Also, as shown in FIG. 8B, the resilient portions 50b are normally bent toward one side (i.e., in the left direction in FIG. 8B) and may be shifted toward the right in FIG. 8B. Corresponding to the movement of the resilient portions 50b, the push plate 48 has a plurality of recesses 48a at desired portions (see FIG. 2). A projection 45b is formed in an inner peripheral portion of the clutch plate 45 as shown in FIG. 7A. The projection 45b is inserted into the recess 42b of the clutch case 42 as shown in FIG. 4 to thereby prevent the rotation of the clutch plate 45. Furthermore, the rotational angle of the clutch adjustment handle 44 is restricted by the projections 44c of the clutch adjustment handle 44 shown in FIG. 5 and the projection 42c of the clutch case 42 shown in FIG. 4.

The operation of the thus constructed electric drill will be described.

First of all, the operator grips the grip part B of the tool body 1 while hooking his finger to the trigger switch 32, and he operates the trigger switch. Then, the switch body 30 is turned on and the drive motor 2 is drivingly rotated. As a result, the rotational torque of the drive motor 2 is transmitted to the spline shaft 18 through the output pinion 4, the respective planetary gears 5, 12 and 14, the sun gears 8 and 13 and the like in a speed reduction manner. Thus, the tool mounted on the chuck 20 is rotated to perform a desired work.

By the way, when a load imposed on the tool is increased during the machining operation, a reaction force is imposed on the inwardly toothed gear 15, so that the inwardly toothed gear 15 is rotated. However, since the steel balls 41 are clamped by the clutch surface 15a of the inwardly toothed gear 15, the rotation is suppressed. Nevertheless, if the load imposed on the inwardly toothed gear 15 would be increased, a force for moving the steel balls 41 in the right direction (in FIG. 2) would be generated, so that the steel balls 41 are moved in the right direction (in FIG. 2) against the biasing force of the spring, and the steel balls 41 are out of engagement with the clutch surface 15a. Thus, the inwardly toothed gear 15 is rotated. The rotation of the inwardly toothed gear 15 prevents the rotational power from the drive motor 2 from transmitting to the spline shaft 18. Thus, the rotation of the spline shaft 18 is prevented.

The adjustment of the rotational torque of the spline shaft 18 will be explained.

First of all, the clutch adjustment handle 44 is rotated, so that the position of the recesses 44a of the clutch adjustment handle 44 with which the projections 50c of the positioning plate 50 engage is changed. By this operation, the claws 45a of the clutch plate 45 which abut against the slant surfaces 44b are moved in the axial direction along the slant surfaces 44b, so that the gap in which the spring 47 is disposed is changed in size. As a result, the biasing force for pushing the steel balls 41 toward the clutch surface 15a of the inwardly toothed gear 15 through the abutment plate 46 is changed. Thus, the magnitude of the force for suppressing the rotation of the inwardly toothed gear 15 is changed. Thus, it is possible to adjust the rotational torque.

The resiliency of the resilient portions 50b of the positioning plate 50 causes a click action when the clutch adjustment handle 44 is rotated.

Due to the fact that the plurality of recesses 44a are formed in the flanged portion 44d of the clutch adjustment handle 44, it is possible to adjust the rotational angle of the clutch adjustment handle 44 in plural stages. In addition, since the setting of the rotational angle is carried out between the clutch adjustment handle 44 and the positioning plate 50 formed of steel plate and the projections 50c of the positioning plate 50 extend in the radial direction, it is possible to make the contact condition with the recess portions 44a in a linear contact. Thus, it is possible to prevent wear and deformation of the recesses 44a and the projections 50c. The wear resistant effect is enhanced.

As described above, according to the invention, since the slant surfaces formed in the torque adjustment sleeve is linear, the force for pushing the slant surfaces of the torque adjustment plate is gently changed, and it is easy to control the contact height of the resilient member. It is therefore easy to set a magnitude of the maximum torque. Also, since the torque adjustment plate does not receive a shock, it is possible to prevent wear and deformation of the slant surfaces. Thus, it is possible to enhance the durability. Furthermore, since the rotational positioning operation of the torque adjustment sleeve is carried by the engagement portion formed between the torque adjustment sleeve and the positioning plate, the depression forces applied to the respective engagement portions may be kept constant irrespective of the compression of the resilient members and are very small in comparison with the compression forces of the resilient members. It is possible to enhance the durability of the engagement portions, and it is possible to normally impart click feeling. Moreover, since no axial movement of the torque adjustment sleeve is generated when the torque adjustment sleeve is rotated, there is no gap between the housing and the torque adjustment sleeve. It is therefore possible to ensure an outer appearance design. Also, since the slant surface of the torque adjustment sleeve is gently changed, upon the rotation of the torque adjustment sleeve, the rotational force of the torque adjustment sleeve does not largely depend upon the compression force of the resilient members. Accordingly, a large force is not required. The operator whose gripping force is weak may readily rotate the torque adjustment sleeve.

What is claimed is:

1. A torque adjustment device for adjusting the operation of a clutch mechanism for transmitting rotational force from a drive source to a spindle, wherein one end of a cylindrical torque adjustment sleeve is rotatably mounted at an opening portion of a housing, a bearing clutch case for supporting the spindle is received in the torque adjustment sleeve, a plurality of slant surfaces which are slanted in the circumferential direction of the torque adjustment sleeve such that the height of each surface changes in the axial direction of the torque adjustment sleeve are formed in an inner circumferential portion of the torque adjustment sleeve, a torque adjustment plate is supported on the slanted surfaces, a resilient member is interposed between the torque adjustment plate and the clutch mechanism, a positioning plate provided at an end face of the bearing clutch case is in abutment with the other end of the torque adjustment sleeve, and a click mechanism is formed between the positioning plate and the other end of the torque adjustment sleeve.

2. A torque adjustment device according to claim 1, wherein said click mechanism comprises a plurality of recesses disposed annularly an a flanged portion which is formed on the other end of the torque adjustment sleeve, and at least one projection on a resilient portion formed on the positioning plate, said projection selectively engaging with one of the recesses of the torque adjustment sleeve.

3. A torque adjustment device according to claim 2, wherein the positioning plate is covered with a push plate with at least one recess for ensuring a movement of the resilient portion of the positioning plate.

4. A torque adjustment device according to claim 1, wherein said torque adjustment plate comprises a plurality of claws which abut against the slanted surfaces.

5. A torque adjustment device according to claim 1, wherein said clutch mechanism comprises a plurality of balls which are retained in holes formed in the bearing clutch case and urged toward a clutch surface of a speed reduction gear by the resilient member via an abutment plate.

6. An electric drill having a spindle onto which a working tool is mounted, a drive motor, a switch means for turning on/off the motor, a speed reduction means including planetary gears, a torque adjustment mechanism for adjusting a maximum torque to be transmitted to said spindle and a housing for receiving said speed reduction means, said torque adjustment means including:
a substantially cylindrical torque adjustment sleeve rotatably mounted at one end of said housing;
a bearing clutch case for supporting said spindle received in said torque adjustment sleeve;
a plurality of slanted surfaces formed in said torque adjustment sleeve, said slanted surfaces being slanted in the circumferential direction of said torque adjustment sleeve such that the height of each surface changes in the axial direction of said torque adjustment sleeve;
a torque adjustment plate supported on said slanted surfaces;
a resilient member interposed between said torque adjustment plate and said speed reduction means;
a position plate disposed at the other end of said bearing clutch case; and
a click mechanism formed between the torque adjustment sleeve and said positioning plate.

7. A drill according to claim 6, wherein said click mechanism comprises a plurality of recesses disposed annularly on a flanged portion which is formed on the other end of the torque adjustment sleeve, and at least one projection on a resilient portion formed on the positioning plate, said projection selectively engaging with one of the recesses of the torque adjustment sleeve.

8. A drill according to claim 6, wherein the positioning plate is covered with a push plate with at least one recess for ensuring a movement of the resilient portion of the positioning plate.

9. A drill according to claim 6, wherein said torque adjustment plate comprises a plurality of claws which abut against the slanted surfaces.

10. A drill according to claim 6, wherein said clutch mechanism comprises a plurality of balls which are retained in holes formed in the bearing clutch case and urged toward a clutch surface of a speed reduction gear by the resilient member via an abutment plate.

* * * * *